United States Patent
Hong et al.

(10) Patent No.: US 6,906,123 B2
(45) Date of Patent: Jun. 14, 2005

(54) FLAMEPROOF STYRENE-CONTAINING GRAFT RESIN COMPOSITIONS HAVING A PARTICULAR NITRILE CONTENT DISTRIBUTION

(75) Inventors: Sang-Hyun Hong, Kyungki-do (KR); Yong-Hae Kweon, Seoul (KR); Bok-Nam Jang, Seoul (KR); Young-Kil Chang, Kyungki-do (KR); Gyu-Cheol Lee, Kyungki-do (KR)

(73) Assignee: Cheil Industries Inc., Kyungbuk (KR)

( * ) Notice: Subject to any disclaimer, the term of this patent is extended or adjusted under 35 U.S.C. 154(b) by 685 days.

(21) Appl. No.: 10/051,368

(22) Filed: Jan. 17, 2002

(65) Prior Publication Data

US 2002/0137824 A1 Sep. 26, 2002

Related U.S. Application Data

(63) Continuation-in-part of application No. 09/580,908, filed on May 31, 2000, now abandoned, and a continuation-in-part of application No. 10/052,205, filed on Jan. 16, 2002, now Pat. No. 6,716,900, which is a continuation-in-part of application No. 09/473,607, filed on Dec. 29, 1999, now abandoned, and a continuation-in-part of application No. 09/473,553, filed on Dec. 29, 1999, now abandoned, and a continuation-in-part of application No. 09/580,907, filed on May 31, 2000, now Pat. No. 6,653,374, and a continuation-in-part of application No. 10/011,056, filed on Dec. 6, 2001, now Pat. No. 6,646,032, which is a continuation of application No. 09/233,415, filed on Jan. 19, 1999, now abandoned.

(30) Foreign Application Priority Data

| Sep. 2, 1998 | (KR) | ............................................. 98-36004 |
| Jul. 14, 1999 | (KR) | ............................................. 99-28442 |
| Jul. 14, 1999 | (KR) | ............................................. 99-28443 |
| Jul. 14, 1999 | (KR) | ............................................. 99-28444 |
| Nov. 30, 1999 | (KR) | ............................................. 99-53747 |

(51) Int. Cl.$^7$ .............................. C08K 5/49; C08K 5/52
(52) U.S. Cl. ...................... 524/127; 524/141; 524/145; 252/607

(58) Field of Search .................................. 524/115, 127, 524/141, 143, 145

(56) References Cited

U.S. PATENT DOCUMENTS

| 4,360,618 A | * | 11/1982 | Trementozzi | ................ 524/141 |
| 4,578,423 A | * | 3/1986 | Deets | ........................... 525/68 |
| 6,093,760 A | * | 7/2000 | Nishihara | .................... 524/145 |

* cited by examiner

Primary Examiner—Cephia D. Toomer
(74) Attorney, Agent, or Firm—Maria Parrish Tungol

(57) ABSTRACT

A flameproof thermoplastic resin composition substantially free of phenolic resin, red phosphorous and silicone resin comprises (A) about 40–95 parts by weight of a rubber modified styrene-containing graft copolymer resin, (B) about 5–60 parts by weight of polyphenylene ether resin; (C) about 5–30 parts by weight of aromatic phosphoric acid ester per 100 part by weight of (A) and (B) wherein the styrene-containing copolymer chains in rubber modified styrene-containing resin (A) comprise (i) about 5–20% by weight having an acrylonitrile fractionation content of 0–9% by weight (ii) about 10–40% by weight having an acrylonitrile fractionation content of 9–20% by weight and (iii) about 40–80% by weight having an acrylonitrile fractionation content of not less than 20% by weight acrylonitrile and the sum of (i), (ii), and (iii) is 100% by weight of the total weight of styrene-containing copolymer chains in rubber modified styrene-containing resin (A). The use of a rubber modified styrene-containing copolymer resin having a particular nitrile content distribution with polyphenylene ether resin to form a base resin and an aromatic phosphoric acid ester flame retardant produces resin compositions with high impact strength and flame retardancy. The compositions according to the present invention are substantially free of phenolic resin, red phosphorous, silicone resin and other components that are required by the prior art compositions containing polyphenylene ether resins and ABS type graft copolymers.

33 Claims, No Drawings

FLAMEPROOF STYRENE-CONTAINING GRAFT RESIN COMPOSITIONS HAVING A PARTICULAR NITRILE CONTENT DISTRIBUTION

This application is a continuation-in-part of application Ser. No. 09/580,908 filed on May 31, 2000, now abandoned; and Ser. No. 10/052,205, filed on Jan. 16, 2002, now U.S. Pat. No. 6,716,900; which is a continuation-in-part of Ser. No. 09/473,607 filed on Dec. 29, 1999, now abandoned; and Ser. No. 09/473,553 filed on Dec. 29, 1999, now abandoned; and Ser. No 09/580,907 filed May 31, 2000, now U.S. Pat. No. 6,653,374; and Ser. No. 10/011,056 filed Dec. 6, 2001, now U.S. Pat. No. 6,646,032; which is a continuation of Ser. No. 09/233,415 filed Jan. 19, 1999, now abandoned.

FIELD OF THE INVENTION

The present invention relates to a flameproof thermoplastic resin composition. More particularly, the present invention relates to a flameproof thermoplastic resin composition that comprises a rubber modified styrene-containing copolymer resin, and a polyphenylene ether resin as a base resin, and a phosphoric acid ester compound resin as a flame retardant.

BACKGROUND OF THE INVENTION

A rubber modified styrene-containing resin has a good processability, a high impact strength, and a good appearance. Accordingly, the resin has been widely applied to electric appliances and office supplies. In case that a rubber modified styrene-containing resin is applied to personal computers, facsimiles, and the like which emit heat, flame-retardant property should be given to the resin due to its combustibility.

A widely known method for providing flame retardancy to resin compositions is the addition of halogen-containing compounds and antimony-containing compounds to a rubber modified styrene-containing resin to provide flame-retardant property. The halogen-containing compounds used in conventional methods are, for example, polybromodiphenyl ether, tetrabromobisphenol A, epoxy compounds substituted by bromine, chlorinated polyethylene, etc. An antimony trioxide and antimony pentaoxide are commonly used as antimony-containing compounds. The methods for improvement of flame-retardant property by applying halogen- and antimony-containing compound have advantages of being a convenient method of obtaining flame-retardant property and no degradation of the physical properties. However, the disadvantages are that the halogen-containing compound results in the corrosion of the mold itself by the hydrogen halide gases released during the molding process. Hydrogen halide gas is extremely harmful due to the toxic gases liberated during combustion of articles containing halogen-containing flame retardants. Since polybromodiphenyl ether compounds that are mainly used for a halogen-containing flame retardant can produce toxic gases such as dioxin or furan during combustion, flame retardant compositions which are not prepared with halogen-containing compound have become important in this field.

It is known to use phosphorus or nitrogen compounds as halogen-free flame retardants in resin compositions. However, usage of only phosphorus compound deteriorates heat resistance of a rubber modified styrene-containing resin and does not impart sufficient flame retardancy. Generally, when a rubber modified styrene-containing resin such as acrylonitrile-butadiene-styrene (ABS) is burned, char is scarcely produced due to decomposition and vaporization in most parts (Journal of Applied Polymer Science, 1998, vol. 68, p. 1067). Therefore, to impart an effect of flame retardancy, it is necessary to add a char-forming agent to a resin composition, which plays a role to prohibit entrance of oxygen and emission of fuel by forming char on the surface of rubber with three-dimensional carbon chain bonds under combustion.

Japanese Patent Laid-open No. 7-4849 1 discloses a flameproof thermoplastic resin, made of adding a novolac phenolic resin and a phosphoric acid ester in to a thermoplastic copolymer resin composed of a rubber copolymer and an aromatic vinyl monomer. It was found that in order to obtain a good property of flame retardancy, a phenolic resin as a char-forming agent and a phosphoric acid ester compound as a flame retardant should be added in a lot of amount. However, in this case, the heat resistance of the resin composition is dropped suddenly. Therefore, many studies have been done to prepare a flameproof resin composition which does not contain phenol resin but shows a good flame retardancy and heat-resistant.

U.S. Pat. No. 4,360,618 discloses that the impact strength and heat-resistance of a resin composition was improved by mixing SAN resin or ABS resin copolymer with 2 to 8% by weight of acrylonitrile to improve compatibility of polyphenylene ether and styrene-containing resin with acrylonitrile. U.S. Pat. No. 4,578,423 discloses that the mechanical properties of a resin composition with a high content of acrylonitrile were maintained by blending 10 to 90% by weight of polyphenylene ether with 10 to 90% by weight of SAN resin or ABS resin copolymer with 8 to 17% by weight of acrylonitrile (standard deviation of the weight % of acrylonitrile about the mean value is at least 3.5%). But, if the content of acrylonitrile was higher than that of polyphenylene ether resin, the compatibility of styrene-containing resin and polyphenylene ether deteriorated, so the mechanical property of the resin deteriorated.

Commonly owned Ser. No. 10 011,056, herein incorporated by reference, discloses flame retardant compositions that contain rubber modified styrene-containing resin, polyphenylene ether resin, a styrene/acrylonitrile copolymer having a certain nitrile content, and phenolic resin with aromatic phosphate esters having melting points above 90° C.

In Ser. No. 10/052,205 filed on Jan. 16, 2002, Ser. No. 09 473,607 and Ser. No. 09 473,553 and Ser. No. 09 580,907, all herein incorporated by reference, the present inventors disclosed blends of rubber modified styrene-containing resins having a particular nitrile content and polyphenylene ether resins wherein their compatability is improved by the use of a compatabilizer having a particular nitrile content. Unlike the prior art compositions discussed previously, the compositions disclosed in these applications do not require phenolic resin to obtain good mechanical properties and flame retardance. On the contrary, the presence of even relatively minor amounts of phenolic resin or red phosphorous in these compositions has adverse effects on properties such as the heat stability and/or the color of the composition.

The present inventors have discovered that the use of a rubber modified styrene-containing copolymer resin with about 15 to 40% by weight, excluding rubber, of a nitrile monomer such as acrylonitrile having a particular nitrile content distribution with polyphenylene ether resin and an aromatic phosphoric acid ester flame retardant produces resin compositions with high impact strength and flame retardancy. The compositions according to the present invention are substantially free of phenolic resin, red phosphorous, silicone resin and other components that are required by the prior art compositions.

SUMMARY OF THE INVENTION

A flameproof thermoplastic resin composition is disclosed which is substantially free of phenolic resin, red phosphorous and silicone resin comprising (A) about 40–95 parts by weight of a rubber modified styrene-containing graft copolymer resin, (B) about 5–60 parts by weight of polyphenylene ether resin; (C) about 5–30 parts by weight of aromatic phosphoric acid ester per 100 part by weight of (A) and (B), wherein the rubber modified styrene-containing resin (A) wherein the styrene-containing copolymer chains in rubber modified styrene-containing resin (A) comprise
  (i) about 5–20% by weight having an acrylonitrile fractionation content of 0–9% by weight
  (ii) about 10–40% by weight having an acrylonitrile fractionation content of 9–20% by weight and
  (iii) about 40–80% by weight having an acrylonitrile fractionation content of not less than 20% by weight acrylonitrile
and the sum of (i), (ii), and (iii) is 100% by weight of the total weight of styrene-containing copolymer chains in rubber modified styrene-containing resin (A).

Generally, rubber modified styrene-containing copolymer resins such as g-ABS and polyphenylene ether resin do not have good compatibility when blended. However, the compatibility of g-ABS type resin and polyphenylene ether resin in the compositions of the present invention was improved by employing using the rubber modified resin (A) having the amounts and distribution of nitrile units within the ranges of (i), (ii), and (iii)

DETAILED DESCRIPTION OF THE INVENTION (A) Rubber Modified Styrene-containing Resin The rubber modified styrene-containing copolymer resin (A) according to the present invention is a rubber phase copolymer which is dispersed in the form of particles in a matrix comprising styrene-containing copolymers. The rubber modified resin is prepared by mixing at least one styrene-containing monomer and at least one unsaturated nitrile monomer, which can be polymerized therewith, in the presence of a rubber phase polymer. Rubber modified styrene-containing resin (A) is prepared by known methods such as an emulsion polymerization, a suspension polymerization or a bulk polymerization. Rubber modified resins are conventionally produced by extrusion with a styrene-containing graft copolymer resin and a styrene-containing copolymer resin. In a bulk polymerization, both a styrene-containing graft copolymer resin and a styrene-containing copolymer resin are not prepared separately but prepared together in one process, thereby to produce a rubber modified styrene-containing resin. In either case, the contents of rubber in the final rubber modified styrene-containing resin to the total weight of the base resin are preferably about 5–30 parts by weight.

Rubber modified styrene-containing resin (A) is comprised of styrene-containing graft copolymer (A1) and optionally also contains styrene-containing copolymer (A2) which will be described in detail hereafter.

In the compositions according to the present invention, the rubber modified resin (A) contains styrene-containing copolymer chains having certain nitrile content distribution as determined by a known fractionation method. Fractionation methods to determine properties such as the amount and distribution of nitrile units such as acrylonitrile units in copolymer chains are known in the art, e.g., U.S. Pat. No. 4,578,423, herein incorporated by reference. A fractionation method that can be used to evaluate the compositions of the present invention is described in an article by Teramachi (Journal of Macromol. Sci. Chem., A2(6), 1968, 1169) herein incorporated by reference. Fractionation is a process for the separation of polymeric specimens into components (called "fractions") which differ in a particular property, depending on the solvent used. Appropriate solvents such as methylethyl ketone and cyclohexane mixtures are typically used to fractionate resin compositions to separate copolymer chains having certain amounts of acrylonitrile. Fractionation typically involves the adjustment of the solution conditions so that two liquid phases are in equilibrium, removal of one phase as a first fraction, and then adjusting solution conditions to obtain a second separated phase as a second fraction, and so on.

The nitrile unit content of the separated fractions can be measured by known methods. Hereafter, the nitrile unit content determined by means of fractionation methods and subsequent analysis of the fractions is referred to as the acrylonitrile fractionation content. As disclosed hereafter, the styrene-containing copolymer chains can contain acrylonitrile or methacylonitrile, or a mixture thereof.

Fractions measured in copolymers containing about 15–40% by weight of nitrile monomer are 0–9% by weight, 9–20% by weight, and not less than 20% by weight, preferably 20–50% by weight. It is known in the art that various fractions collected by fractionation always overlap to some extent. When determined by fractionation methods, the distribution of the acrylonitrile content overlaps between fractions so the ranges of acrylonitrile fractionation content overlap. Various mathematical techniques are known in the art to allow for such overlapping in determining the amount of the different fractions.

The styrene-containing copolymer chains in rubber modified resin (A) are comprised of (i) about 5–20% by weight having an acrylonitrile fractionation content of 0–9% by weight, (ii) about 10–40% by weight having an acrylonitrile fractionation content of 9–20% by weight, and (iii) about 40–80% by weight having an acrylonitrile fractionation content of not less than 20%, preferably 20–50% by weight, wherein the sum of (i), (ii), and (iii) is 100% by weight of the total weight of styrene-containing copolymer chains in rubber modified resin (A).

The acrylonitrile fractionation content of a styrene-containing copolymer can be determined by a fractionation method without additional separation steps. In order to measure the acrylonitrile fractionation content of a rubber modified graft copolymer resin such as g-ABS having styrene and nitrile units, the styrene/acrylonitrile components are separated from the g-ABS before fractionation. Solvents such as acetone which does not dissolve rubber is used to extract the styrene/acrylonitrile components. The fractionation method is then used to determine the acrylonitrile content distribution of the extracted components. In rubber modified styrene-containing resin (A), graft copolymer resin (A1) can be used alone or in combination with copolymer resin (A2). The rubber modified styrene-containing resin (A) can contain about 0–80% by weight of a styrene-containing copolymer (A2), preferably about 10–70% by weight.

It is preferable to use a mixture of (A1) and (A2) taking into consideration their compatibility. By using a mixture, neither (A1) nor (A2) alone needs to have the acrylonitrile content distribution recited in (i), (ii), or (iii) as long as the rubber modified resin (A) has the distribution recited in (i)–(iii). Therefore, if analysis shows that a batch of graft copolymer (A1) does not have the required nitrile distribution, an appropriate amount of copolymer (A2) is added to produce the composition according to the invention.

Styrene-containing Graft Copolymer (A1)

The styrene-containing graft copolymer (A1) is formed by grafting a styrene-containing copolymer (styrene-containing copolymer b)) onto a suitable rubber. Examples of suitable rubbers are a diene-containing rubber such as a polybutadiene, poly(styrene-butadiene) and a poly(acrylonitrile-butadiene); a saturated rubber in which hydrogen is added to said diene-containing rubber; an isoprene rubber; a chloroprene rubber; a poly (butyl acrylate); and a terpolymer of ethylene-propylene-diene. Diene-containing rubbers are preferred and butadiene-containing rubber is most preferred.

It is preferable that the rubber content of graft copolymer (A1) is about 10 to 60% by weight.

To obtain good impact strength and appearance when said graft copolymer (A1) is prepared, the average size of rubber particles is preferred to be in the range of from 0.1 to 4 μm.

Styrene-containing Copolymer b)

Suitable styrene-containing monomers used to form styrene-containing copolymer b) include styrene, α-methylstyrene, p-methylstyrene, and related styrene monomers that are known in the art for producing styrene/acrylonitrile type monomers. Styrene is the preferred monomer. At least one unsaturated nitrile monomer is copolymerized with the styrene-containing monomer. Suitable unsaturated nitrile monomers include acrylonitrile and methacrylonitrile and mixtures thereof. The preferred monomer is acrylonitrile.

Styrene-containing copolymer b) is prepared by polymerizing about 60–85% by weight of a styrene-containing monomer and about 15–40% by weight of at least one unsaturated nitrile monomer, preferably about 17–30% by weight. The unsaturated nitrile monomer will be represented in the description of the present invention by reference to acrylonitrile but methacrylonitrile can be used in place of acrylonitrile or in admixture with acrylonitrile.

The amount of styrene-containing copolymer b) in graft copolymer (A) is about 40–90% by weight. When rubber modified resin (A) is comprised of 100% of styrene-containing graft copolymer (A1), the styrene-containing copolymer chains in graft copolymer (A1) are comprised of (i) about 5–20% by weight having an acrylonitrile fractionation content of 0–9% by weight, (ii) about 10–40% by weight having an acrylonitrile fractionation content of 9–20% by weight, and (iii) about 40–80% by weight having an acrylonitrile fractionation content of not less than 20%, preferably 20–50%, by weight, wherein the sum of (i), (ii), and (iii) is 100% by weight of the total weight of styrene-containing copolymer chains in styrene-containing graft copolymer (A1).

Styrene-containing graft copolymers suitable for use as (A1) can be made by methods known in the art, e.g., the methods disclosed in U.S. Pat. No. 4,360,618 and U.S. Pat. No. 4,578,423, both herein incorporated by reference, for producing styrene-containing graft copolymers or copolymers having the desired nitrile content distribution.

In addition, in order to give good characteristics of processability and heat resistance, other monomers such as acrylic acid, methacryl acid, maleic anhydride and N-substituted maleimide can be added in the graft polymerization. The amounts of the monomers are in the range of 0 to 40 parts by weight based on the total of said graft copolymer resin as long as the resulting SAN copolymer b) has the required acrylonitrile content distribution.

Examples of the types of resins suitable for use as styrene-containing graft copolymer (A1) are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like.

The compositions of the present invention comprise about 40–95 parts by weight of the rubber modified styrene-containing resin (A), preferably about 50–90 parts by weight.

Styrene-containing Copolymer (A2)

If rubber modified resin (A) initially contains graft copolymer (A1) wherein the amounts and distribution of styrene-copolymer chains do not fall within the ranges of (i), (ii), or (iii), then appropriate amounts of styrene-containing copolymer (A2) can be added to (A1) so that the total amounts of styrene-containing copolymer chains in (A1) and (A2) are comprised of the amounts and distributions within the ranges of (i), (ii), and (iii). In the process of preparing the rubber modified copolymer resin, the copolymer (A2) may be prepared separately and then blended with graft copolymer resin (A1) as needed.

Styrene-containing copolymer (A2) is prepared by polymerizing about 60 to 85% by weight of a styrene-containing monomer such as styrene and about 15–40%, preferably about 17–30%, by weight of an unsaturated nitrile-containing monomer. Suitable styrene-containing monomers used to form styrene-containing copolymer b) include styrene, α-methylstyrene, p-methylstyrene, and related styrene monomers that are known in the art for producing styrene/acrylonitrile type monomers. Styrene is the preferred monomer. At least one unsaturated nitrile monomer is copolymerized with the styrene-containing monomer. Suitable unsaturated nitrile monomers include acrylonitrile and methacrylonitrile and mixtures thereof. The preferred monomer is acrylonitrile.

In addition, in order to give good characteristics of processability and heat resistance, other monomers such as acrylic acid, methacryl acid, maleic anhydride and N-substituted maleimide can be added in the graft polymerization. The amounts of the other monomers are in the range of 0 to 40 parts by weight based on the total of said copolymer resin (A2) provided that the copolymer (A2) contains about 15–40% by weight of unsaturated nitrile-containing monomer.

Styrene-containing copolymer (A2) can be prepared by known methods such as an emulsion polymerization, a suspension polymerization or a bulk polymerization. It is preferred that weight average molecular weight of the resin ranges from 50,000 to 400,000. The examples of the copolymerizable monomer to the styrene-containing copolymer (A2) are methacrylate or phenyl maleimide and related monomers known in the art. In order to improve a heat resistance, α-methylstyrene can be used in place of styrene or in combination with styrene.

When rubber modified resin (A) is comprised of a mixture of styrene-containing graft copolymer (A1) and styrene-containing copolymer (A2), the styrene-containing copolymer chains in rubber modified resin (A) are comprised of (i) about 5–20% by weight having an acrylonitrile fractionation content of 0–9% by weight, (ii) about 10–40% by weight having an acrylonitrile fractionation content of 9–20% by weight, and (iii) about 40–80% by weight having an acrylonitrile fractionation content of not less than 20%, preferably 20–50% by weight, wherein the sum of (i), (ii), and (iii) is 100% by weight of the total weight of styrene-containing copolymer chains in graft copolymer (A1) and copolymer (A2) in rubber modified resin (A).

Rubber modified resin (A) can be prepared by various methods such as preparing styrene-containing graft copolymer (A1) comprised of styrene-containing copolymer chains in amounts and distribution recited in (i)–(iii) by methods known in the art. Another method includes combining appropriate amounts of styrene-containing copolymer (A2) and graft copolymer (A1) so that the combined styrene-containing copolymer chains in (A1) and (A2) are present in amounts and distribution recited in (i)–(iii). It may be convenient to combine amounts of other styrene-containing graft copolymers such as g-ABS or styrene-containing copolymers with a rubber modified resin (A) comprising graft copolymer (A1) (or a mixture of graft copolymer (A1) and copolymer (A2)) so that the styrene-containing copolymer chains in the resulting resin (A) are present in amounts and distribution as recited in (i)–(iii). This method permits the use of known commercially available copolymers and/or graft copolymers in the compositions according to the present invention.

Polyphenylene Ether Resin (B)

Polyphenylene ether resin is employed as a base resin to improve the flame retardancy, heat resistance and rigidity of the resin composition according to the present invention. As examples of the polyphenylene ether resin, poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,5-triethyl-1,4-phenylene) ether can be used. Suitable polyphenylene ether resins are also disclosed in Ser. Nos. 10 011,056 and 10/052,205.

Preferably, copolymer of poly(2,6-dimethyl-1,4-phenylene) ether and poly(2,3,6-trimethyl-1,4-phenylene) ether, and poly(2,6-dimethyl-1,4-phenylene) ether are used, poly(2,6-dimethyl-1,4-phenylene) ether being most preferred.

The degree of polymerization of polyphenylene ether is not required to be defined specifically, but considering heat-stability or processability of the resin composition, it is preferable that the viscosity of polyphenylene ether is in the range of 0.2 to 0.8 measured in chloroform solvent at 25° C. The polyphenylene ether resin is used in the amount of about 5–60 parts by weight, preferably about 10–50 parts by weight.

Aromatic Phosphoric Acid Ester Compound (C)

The aromatic phosphoric acid ester compound used in the present invention are known in the art and have the following structural formula:

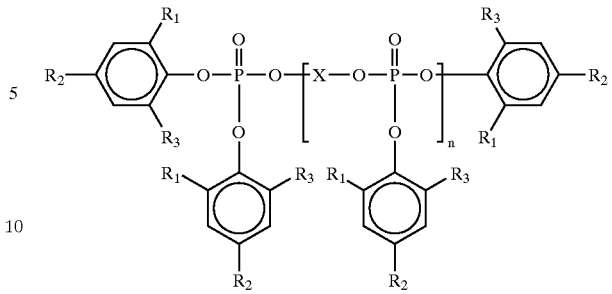

wherein $R_1$, $R_2$ and $R_3$ independently of one another are hydrogen or $C_1$–$C_4$ alkyl; X is $C_6$–$C_{20}$ aryl or alkyl substituted $C_6$–$C_{20}$ aryl group which is a dialcohol derivative. Preferably, X is a dialcohol derivative selected from the group consisting of resorcinol, diphenol, hydroquinol, bisphenol-A and bisphenol-S; and n is 0–4.

Suitable phosphate ester flame retardants are disclosed in Ser. No. 10 011,056 and 10/052,205. When n is 0, the compounds include triphenyl phosphate, tricresyl phosphate, trixylenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, and the like, and where n is 1, the compound include resorcinol bis (diphenyl) phosphate, resorcinol bis(2,6-dimethyl phenyl) phosphate, resorcinol bis(2,4-ditertiary butyl phenyl) phosphate, hydroquinone (2,6-dimethyl phenyl) phosphate, hydroquinone (2,4-ditertiary butyl phenyl)phosphate, and related phosphate ester flame retardants. The phosphoric acid ester compound may be used alone or mixture there of, and is typically used in amount of about 5–30 parts by weight, preferably about 5–25 parts by weight per 100 parts by weight of components (A) and (B).

Other additives may be contained in the resin composition of the present invention. The additives include an anti-dripping agent, an impact modifier, plasticizer, a heat stabilizer, an oxidation inhibitor, a light stabilizer, a compatibilizer and the like. An inorganic filler such as talc, silica, mica, glass fiber, organic or inorganic pigment and/or dye can also be added. The additives can be employed in amounts of about 0 to 30 parts by weight on the basis of 100 parts by weight of (A) and (B).

Like the compositions disclosed in Ser. No. 10/052,205, compositions according to the present invention do not require the use of red phosphorous to have acceptable physical properties and flame retardance. Inclusion of red phosphorous as disclosed in U.S. Pat. No. 4,966,814 would be expected to result in the production of toxic phosphine gas during the process of preparing the compositions or during the combustion of products made from the compositions. Furthermore, the presence of red phosphorous causes a reddish color in the resin composition. Reddish color has been observed in compositions containing as little as 0.5 parts by weight based on 100 parts by weight of (A) and (B). Reddish color can be determined by visual inspection or other methods known in the art using a calorimeter.

The compositions according to the present invention are substantially free of red phosphorous which means that any amount of red phosphorous in the composition is less than 0.5 parts by weight based on 100 parts by weight of (A) and (B). It is preferred that the compositions according to the present invention contain about 0% by weight of red phosphorous which is not intended to exclude trace amounts of red phosphorous that do not affect the color of the resin composition.

Unlike the compositions disclosed in the prior art such as those disclosed in U.S. Pat. No. 4,618,633 and U.S. Pat. No. 5,605,962, the compositions according to the present invention are substantially free of phenolic resin which means that any amount of phenolic resin present in the composition is less than 1 part by weight based on 100 parts by weight of (A) and (B) and does not adversely affect properties such as heat stability as measured by ΔE described in Ser. No. 10/052,205. It is preferred that the compositions according to the present invention contain about 0% by weight of phenolic resin which is not intended to exclude trace amounts of phenolic resin that do not affect the properties of the composition.

The addition of other resins such as certain silicone resins in amounts as small as 0.5 parts by weight based on 100 parts by weight based on 100 parts of (A) and (B) significantly decreased impact strength and flame retardancy of the resulting composition. Therefore, the compositions according to the present invention do not require silicone resins such as those disclosed in U.S. Pat. No. 5,621,029 and are substantially free of silicone resins. Substantially free of silicone resins means that any amount of silicone resin present in the composition is less than about 0.5 parts by weight based on 100 parts by weight of (A) and (B) and do not produce compositions that fail the UL 94 flame retardancy test and/or reduce the impact strength to values below acceptable commercial limits. The typical limit is 10 (Izod impact strength (⅛" notched)). It is preferred that the compositions according to the present invention contain about 0% by weight of silicone resin which is not intended to exclude trace amounts of silicone resin that do not have a significant adverse effect on the flame retardance and/or impact strength of the resin composition.

The compositions according to the present invention utilize the rubber modified styrene-containing resin (A) together with a polyphenylene ether (B) as a base resin. Unlike the compositions of U.S. Pat. No. 5,621,029, polycarbonate is not used as the base resin in the compositions according to the present invention. The amounts of polycarbonate that may be present in the compositions according to the present invention do not include the amounts of 50% or more that are disclosed in U.S. Pat. No. 5,621,029. Such amounts in the compositions of the present invention would produce compositions that would fail the UL 94 flame retardancy test. When added to compositions according to the present invention, amounts of polycarbonate as little as 3% by weight of the total composition had adverse effects on the physical properties and flame retardance of the resulting composition. Typically, any amount of polycarbonate present in the compositions of the present invention is less than about 2 weight % based on the weight of the composition. It is preferred that, for typical applications, polycarbonate is not present in the resin composition. Therefore, the preferred amount of polycarbonate is about 0% by weight which is not intended to exclude trace amounts of polycarbonate which do not have adverse effects on the physical properties and flame retardance of the resin composition.

The following examples are intended for the purpose of illustration and are not to be construed as limiting the scope of the present invention. In the following examples, all parts and percentage are by weight unless otherwise indicated.

EXAMPLES

Rubber modified styrene-containing copolymer resin (A), polyphenylene ether resin (B), and phosphoric acid ester compound (C) employed to prepare the resin compositions in Examples and Comparative Examples are as follows:

Rubber Modified SAN Copolymer Resin (A)

(A1a) SAN Graft Copolymer Resin (A1) with 22% by Weight of Acrylonitrile in the SAN Copolymer Resin Excluding Rubber Fifty parts by weight of butadiene rubber latex powder (on the basis of solid parts), 39 parts by weight of styrene, and 150 parts by weight of deionized water were blended to the blend, 1.0 parts by weight of rosin soap as an emulsifying agent, 0.3 parts by weight of cumenhydroperoxide, 0.2 parts by weight of mercaptan-containing chain transfer agent, 0.4 parts by weight of glucose, 0.01 parts by weight of ferrous sulfate hydrate, and 0.3 parts by weight of sodium pyrophosphate were added.

The mixture was reacted at 75° C. for 4 hours, while 11 parts by weight of acrylonitrile was added continuously to obtain graft ABS latex. To the ABS latex solid powder, 0.4 parts by weight of sulfuric acid was added, coagulated and dried to obtain SAN graft copolymer resin (g-ABS) in a powder form.

Analysis of the SAN copolymer resin (A1a) showed that, excluding rubber, (A1a) was comprised 8 parts by weight of an SAN copolymer fraction having an acrylonitrile fractionation content of 0 to 9% by weight, 37 parts by weight of SAN copolymer fraction having an acrylonitrile fraction of 9 to 20% by weight, and 55 parts by weight of an SAN copolymer fraction having an acrylonitrile fraction not less than 20% by weight.

(A1b) Graft Copolymer Resin (A1) with 22% by Weight of Acrylonitrile in the SAN Copolymer Resin Excluding Rubber Fifty parts by weight of butadiene rubber latex powder (on the basis of solid parts), 39 parts by weight of styrene, 11 parts by weight of acrylonitrile, and 150 parts by weight of deionized water were blended. To the blend were added 1.0 parts by weight of rosin soap as emulsifying agent, 0.3 parts by weight of cumenhydroperoxide. 0.2 parts by weight of mercaptan-containing chain transfer agent, 0.4 parts by weight of glucose, 0.01 parts by weight of ferrous sulfate hydrate, and 0.3 parts b weight of sodium pyrophosphate.

The blend was reacted at 75° C. for 4 hours to obtain graft ABS latex. To the ABS latex solid powder, 0.4 parts by weight of sulfuric acid was added, coagulated and dried to obtain SAN graft copolymer resin (g-ABS) in a powder form.

Analysis of the SAN copolymer resin (A1b) showed that, excluding rubber, (A1b) was comprised of 0 parts by weight of an SAN copolymer fraction having an acrylonitrile fractionation content of 0 to 9% by weight, 2.5 parts by weight of SAN copolymer fraction having an acrylonitrile fraction of 9 to 20% by weight, and 97.5 parts by weight of an SAN copolymer fraction having an acrylonitrile fraction not less than 20% by weight (A2a) SAN Copolymer b) with 25% by Weight of Acrylonitrile Seventy-five parts by weight of styrene, 5 parts by weight of acrylonitrile, 120 parts by weight of deionized water, 0.2 parts by weight of 1,1'-di(t-butylperoxy)-3,3',5-trimethyl cyclohexane, and 0.1 parts by weight of azobisisobutylonitrile were blended.

To the blend, 0.4 parts by weight of tricalciumphosphate and 0.2 parts by weight of mercaptan-containing chain transfer agent were added. The resultant solution was heated to 80° C. for 90 minutes and kept for 150 minutes. Twenty parts by weight of acrylonitrile were injected into the resultant solution, the resultant solution reheated to 95° C., kept for 120 minutes, then the SAN copolymer resin with 25% by weight of acrylonitrile was prepared. The resultant was washed, dehydrated and dried. Styrene-acrylonitrile copolymer (SAN) having a weight average molecular weight of 100,000 to 140,000 was obtained.

Analysis of the SAN copolymer (A2a) showed that (A2a) was comprised 9 parts by weight of an SAN copolymer fraction having an acrylonitrile fractionation content of 0 to 9% by weight, 35 parts by weight of an SAN copolymer fraction having an acrylonitrile fractionation content of 9 to 20% by weight, and 56 parts by weight of an SAN copolymer fraction having an acrylonitrile fractionation content that was not less than 20% by weight.

(A2b) SAN Copolymer b) with 25% by Weight of Acrylonitrile

Seventy-five parts by weight of styrene, 25 parts by weight of acrylonitrile, 120 parts by weight of deionized water, 0.15 parts by weight of azobisisobutylonitrile, 0.4 parts by weight of tricalciumphosphate, and 0.2 parts by weight of mercaptan-containing chain transfer agent were blended. The resultant solution was heated from room temperature to 80° C. for 90 minutes and kept at 80° C. for 180 minutes. The resultant was washed, dehydrated and dried. Styrene-acrylonitrile copolymer (SAN) having a weight average molecular weight of 160,000 to 200,000 was obtained.

Analysis of the SAN copolymer (A2b) was comprised of 0 parts by weight of an SAN copolymer fraction having an acrylonitrile fractionation content of 0 to 9% by weight, 1.8 parts by weight of SAN copolymer fraction having an acrylonitrile fraction of 9 to 20% by weight, and 98.2 parts by weight of an SAN copolymer fraction having an acrylonitrile fraction not less than 20% by weight.

(A2c) SAN Copolymer b) with 13% by Weight of Acrylonitrile

Eighty-seven parts by weight of styrene, 13 parts by weight of acrylonitrile, 120 parts by weight of deionized water, 0.1 parts by weight of azobisisobutylonitrile, 0.2 parts by weight of 1.1'-di(t-butylperoxy)-3,3',5-trimethyl cyclohexane, 0.4 parts by weight of tricalciumphosphate. and 0.3 parts by weight of mercaptan-containing chain transfer agent were blended. The resultant solution was heated from room temperature to 80° C. for 90 minutes and kept at 80° C. for 240 minutes. The resultant solution reheated to 100° C., kept for 240 minutes. The resultant was washed, dehydrated and dried. Styrene-acrylonitrile copolymer (SAN) having a weight average molecular weight of 100,000 to 140,000 was obtained.

Analysis of the SAN copolymer (A2c) showed that (A2c) was comprised of 39 parts by weight of an SAN copolymer fraction having an acrylonitrile fractionation content of 0 to 9% by weight, 57 parts by weight of an SAN copolymer fraction having an acrylonitrile content of 9 to 20% by weight. and 4 parts by weight of an SAN copolymer fraction having an acrylonitrile content that was not less than 20% by weight.

Polyphenylene Ether (PPE) Resin (B)

Poly(2,6-dimethyl-1,4-phenylene) ether of Japan Asai Kasei Co. having an average particulate size of about several µm was used. The product name of powder form was P-402.

Aromatic Phosphoric Acid Ester Compound (C)

Triphenylphosphate (TPP) with a melting point of 48° C. was used.

TABLE 1

|  | Examples | | | Comparative Examples | |
| --- | --- | --- | --- | --- | --- |
|  | 1 | 2 | 3 | 1 | 2 |
| Rubber modified SAN graft copolymer resin (A) | | | | | |
| SAN graft copolymer resin (A1a) | — | — | — | — | 30 |
| Graft ABS resin (A1b) | — | 30 | 30 | 30 | — |
| SAN copolymer resin (A2a) | 45 | — | 45 | — | — |
| SAN copolymer resin (A2b) | — | 32 | — | 45 | — |
| SAN copolymer resin (A2c) | — | 13 | — | — | 45 |
| Polyphenylene ether resin (B) | 25 | 25 | 25 | 25 | 25 |
| Aromatic phosphoric acid ester compound (C) | 19 | 19 | 19 | 5 | 9 |
| Izod impact strength | 25 | 23 | 18 | 5 | 9 |
| Flame retardancy (1/10") | V-1 | V-1 | V-1 | V-1 | V-1 |

The components to prepare resin compositions in Examples 1–3 and Comparative Examples 1–2 were blended as shown in Table 1 and extruded in the form of pellets with a twin-screw extruder at 200–280° C. The pellets were dried at 80° C. for 3 hours and extruded in to test specimens in a 6 oz. extruder at molding temperature of 220–280° C. and barrel temperature of 40–80° C., and the resin pellets were molded into test specimens.

The flame retardancy of the test specimens (1/10") was measured according to UL94 VB, and the Izod impact strength of the test specimens was measured according to ASTM D-256 (1/8" notch, kgfcm/cm).

The resin compositions in Examples 1–3 show good impact strength and flame retardancy. Generally, the rubber modified SAN copolymer resin (g-ABS) and PPE resin do not have good compatibility when blended. However, the compatibility of g-ABS resin and PPE resin in the compositions according to the present invention was improved by employing using the rubber modified resin (A) having the amounts and distribution of nitrile units within the ranges of (i), (ii), and (iii)

The resin according to the present invention had good impact strength. The compositions produced in the Comparative Examples had lower impact strength compared to the compositions of the Examples. In fact, it would be difficult to use a resin composition for electric appliances unless the 1/8" impact strength of a resin is more than 10.

What is claimed is:

1. A flameproof thermoplastic resin composition substantially free of phenolic resin, red phosphorous and silicone resin comprising (A) about 40–95 parts by weight of a rubber modified styrene-containing graft copolymer resin, (B) about 5–60 parts by weight of polyphenylene ether resin; (C) about 5–30 parts by weight of aromatic phosphoric acid ester per 100 part by weight of (A) and (B), wherein the rubber modified styrene-containing resin (A) comprises a styrene-containing graft copolymer resin comprising a) about 10–60% by weight rubber and
    b) about 90–40% by weight of a styrene-containing copolymer grafted onto the rubber wherein the styrene-containing copolymer contains about 15–40% by weight of acrylonitrile and wherein the styrene-containing copolymer chains in rubber modified styrene-containing resin (A) comprise (i) about 5–20% by weight having an acrylonitrile fractionation content of 0–9% by weight
    (ii) about 10–40% by weight having an acrylonitrile fractionation content of 9–20% by weight and (iii) about 40–80% by weight having an acrylonitrile fractionation content of not less than 20% by weight acrylonitrile and the sum of (i), (ii), and (iii) is 100% by weight of the total weight of styrene-containing copolymer chains in rubber modified styrene-containing resin (A).

2. Flameproof thermoplastic resin composition according to claim 1 wherein the rubber modified styrene-containing resin (A) comprises (A1) at least about 20% by weight of a styrene-containing graft copolymer resin comprising
  a) about 10–60% by weight rubber and
  b) about 90–40% by weight of a styrene-containing copolymer grafted onto the rubber wherein the styrene-containing copolymer contains about 15–40% by weight of acrylonitrile.

3. Flameproof thermoplastic resin composition according to claim 2 wherein the rubber modified styrene-containing resin (A) comprises about 30–90% by weight of a styrene-containing graft copolymer resin (A1).

4. Flameproof thermoplastic resin composition according to claim 2 wherein the styrene-containing graft copolymer resin (A1) comprises about 17–30% by weight of acrylonitrile.

5. Flameproof thermoplastic resin composition according to claim 1 wherein the (iii) is about 40–80% by weight having an acrylonitrile fractionation content of 20–50% by weight acrylonitrile.

6. Flameproof thermoplastic resin composition according to claim 1 wherein the polyphenylene ether resin (B) is poly(2,6-dimethyl-1,4-phenylene) ether.

7. Flameproof thermoplastic resin composition according to claim 1 wherein the aromatic phosphoric acid ester has the following formula:

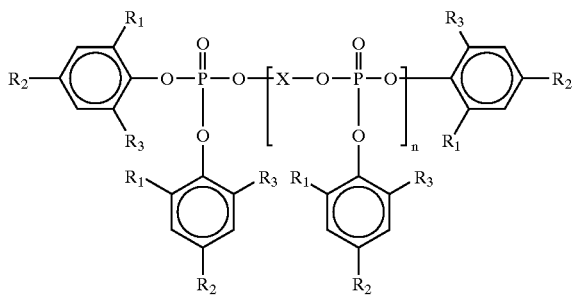

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

8. Flameproof thermoplastic resin composition according to claim 7 wherein the aromatic phosphoric acid ester (C) is a mixture of not less than two aromatic phosphoric acid ester compounds having a different n value.

9. Flameproof thermoplastic resin composition according to claim 7 wherein the aromatic phosphoric acid ester is triphenyl phosphate, tricresyl phosphate, trixylenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, resorcinol bis (diphenyl) phosphate, resorcinol bis(2,6-dimethyl phenyl) phosphate, resorcinol bis(2,4-ditertiary butyl phenyl) phosphate, hydroquinone (2,6-dimethyl phenyl) phosphate, hydroquinone (2,4-ditertiary butyl phenyl) phosphate, or a mixture thereof.

10. Flameproof thermoplastic resin composition according to claim 1 wherein the resin composition contains less than 3% by weight of polycarbonate based on the total weight of the composition.

11. A molding product prepared by the resin composition of claim 2.

12. A flameproof thermoplastic resin composition substantially free of phenolic resin, red phosphorous and silicone resin comprising (A) about 40–95 parts by weight of a rubber modified styrene-containing graft copolymer resin, (B) about 5–60 parts by weight of polyphenylene ether resin; (C) about 5–30 parts by weight of aromatic phosphoric acid ester per 100 part by weight of (A) and (B), wherein the rubber modified styrene-containing resin (A) comprises (A1) about 20–100% by weight of a styrene-containing graft copolymer resin comprising
  a) about 10–60% by weight rubber and
  b) about 90–40% by weight of a styrene-containing copolymer grafted onto the rubber wherein the styrene-containing copolymer contains about 15–40% by weight of acrylonitrile and (A2) about 0–80% by weight of a styrene-containing copolymer containing about 15–40% by weight of acrylonitrile wherein the styrene-containing copolymer chains in rubber modified styrene-containing resin (A) comprise
  (i) about 5–20% by weight having an acrylonitrile fractionation content of 0–9% by weight
  (ii) about 10–40% by weight having an acrylonitrile fractionation content of 9–20% by weight and
  (iii) about 40–80% by weight having an acrylonitrile fractionation content of not less than 20% by weight acrylonitrile and the sum of (i), (ii), and (iii) is 100% by weight of the total weight of styrene-containing copolymer chains in rubber modified styrene-containing resin (A).

13. Flameproof thermoplastic resin composition according to claim 12 wherein the rubber modified styrene-containing resin (A) comprises about 30–90% by weight of a styrene-containing graft copolymer resin (A1).

14. Flameproof thermoplastic resin composition according to claim 12 wherein the styrene-containing graft copolymer resin (A1) comprises about 17–30% by weight of acrylonitrile.

15. Flameproof thermoplastic resin composition according to claim 12 wherein the (iii) is about 40–80% by weight having an acrylonitrile fractionation content of 20–50% by weight acrylonitrile.

16. Flameproof thermoplastic resin composition according to claim 12 wherein the polyphenylene ether resin (B) is poly(2,6-dimethyl-1,4-phenylene) ether.

17. Flameproof thermoplastic resin composition according to claim 12 wherein the aromatic phosphoric acid ester has the following formula:

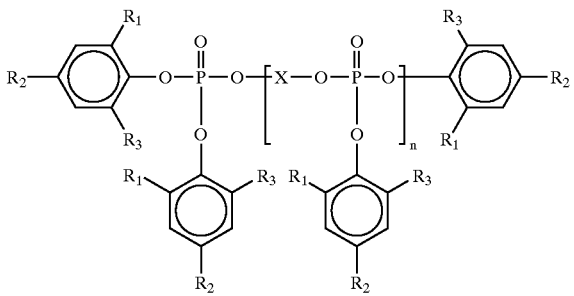

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

18. Flameproof thermoplastic resin composition according to claim 17 wherein the aromatic phosphoric acid ester (C) is a mixture of not less than two aromatic phosphoric acid ester compounds having a different n value.

19. Flameproof thermoplastic resin composition according to claim 17 wherein the aromatic phosphoric acid ester is triphenyl phosphate, tricresyl phosphate, trixylenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, resorcinol bis (diphenyl) phosphate, resorcinol bis(2,6-dimethyl phenyl) phosphate, resorcinol bis(2,4-ditertiary butyl phenyl) phosphate, hydroquinone (2,6-dimethyl phenyl) phosphate, hydroquinone (2,4-ditertiary butyl phenyl) phosphate, or a mixture thereof.

20. Flameproof thermoplastic resin composition according to claim 12 wherein the resin composition contains less than 3% by weight of polycarbonate based on the total weight of the composition.

21. A molding product prepared by the resin composition of claim 12.

22. A flameproof thermoplastic resin composition substantially free of phenolic resin, red phosphorous and silicone resin comprising (A) about 40–95 parts by weight of a rubber modified styrene-containing graft copolymer resin, (B) about 5–60 parts by weight of polyphenylene ether resin; (C) about 5–30 parts by weight of aromatic phosphoric acid ester per 100 part by weight of (A) and (B), wherein the rubber modified styrene-containing resin (A) comprises
  (A1) a styrene-containing graft copolymer resin comprising
    a) about 10–60% by weight rubber and
    b) about 90–40% by weight of a styrene-containing copolymer grafted onto the rubber wherein the styrene-containing copolymer contains about 15–40% by weight of acrylonitrile and
  (A2) a styrene-containing copolymer containing about 15–40% by weight of acrylonitrile
wherein rubber modified resin (A) is prepared by combining graft copolymer (A1) and a sufficient amount of copolymer (A2) so that the the styrene-containing copolymer chains in rubber modified styrene-containing resin (A) comprise (i) about 5–20% by weight having an acrylonitrile fractionation content of 0–9% by weight, (ii) about 10–40% by weight having an acrylonitrile fractionation content of 9–20% by weight, and (iii) about 40–80% by weight having an acrylonitrile fractionation content of not less than 20% by weight acrylonitrile and the sum of (i), (ii), and (iii) is 100% by weight of the total weight of styrene-containing copolymer chains in rubber modified styrene-containing resin (A).

23. A flameproof thermoplastic resin composition according to claim 22 wherein wherein the rubber modified styrene-containing resin (A) comprises at least about 20% (A1).

24. A flameproof thermoplastic resin composition according to claim 22 wherein the graft copolymer (A1) is prepared prior to the addition of copolymer (A2) and copolymer (A2) is combined with graft copolymer (A1) as a separate component.

25. Flameproof thermoplastic resin composition according to claim 22 wherein the rubber modified styrene-containing resin (A) comprises about 30–90% by weight of a styrene-containing graft copolymer resin (A1).

26. Flameproof thermoplastic resin composition according to claim 22 wherein the styrene-containing graft copolymer resin (A1) comprises about 17–30% by weight of acrylonitrile.

27. Flameproof thermoplastic resin composition according to claim 22 wherein the (iii) is about 40–80% by weight having an acrylonitrile fractionation content of 20–50% by weight acrylonitrile.

28. Flameproof thermoplastic resin composition according to claim 22 wherein the polyphenylene ether resin (B) is poly(2,6-dimethyl-1,4-phenylene) ether.

29. Flameproof thermoplastic resin composition according to claim 22 wherein the aromatic phosphoric acid ester has the following formula:

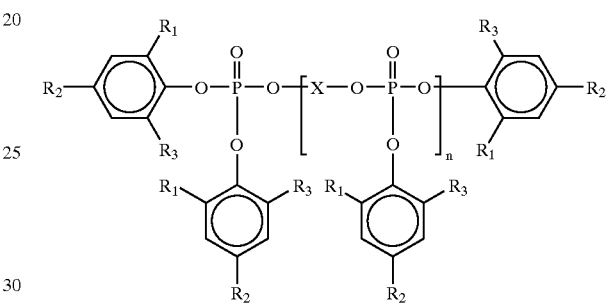

wherein $R_1$, $R_2$ and $R_3$ independently of one another are hydrogen or $C_1$–$C_4$ alkyl; X is a dialcohol derivative selected from the group consisting of resorcinol, diphenol, hydroquinol, bisphenol-A and bisphenol-S; and n is 0–4.

30. Flameproof thermoplastic resin composition according to claim 29 wherein the aromatic phosphoric acid ester (C) is a mixture of not less than two aromatic phosphoric acid ester compounds having a different n value.

31. Flameproof thermoplastic resin composition according to claim 29 wherein the aromatic phosphoric acid ester is triphenyl phosphate, tricresyl phosphate, trixylenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, resorcinol bis (diphenyl) phosphate, resorcinol bis(2,6-dimethyl phenyl) phosphate, resorcinol bis(2,4-ditertiary butyl phenyl) phosphate, hydroquinone (2,6-dimethyl phenyl) phosphate, hydroquinone (2,4-ditertiary butyl phenyl) phosphate, or a mixture thereof.

32. Flameproof thermoplastic resin composition according to claim 22 wherein the resin composition contains less than 3% by weight of polycarbonate based on the total weight of the composition.

33. A molding product prepared by the resin composition of claim 22.

* * * * *